United States Patent
Li et al.

(10) Patent No.: US 8,560,914 B2
(45) Date of Patent: Oct. 15, 2013

(54) METHOD AND DEVICE FOR INDICATING AN UNCORRECTABLE DATA BLOCK

(75) Inventors: Jing Li, Shenzhen (CN); Dongyu Geng, Shenzhen (CN); Dongning Feng, Shenzhen (CN); Raymond W. K. Leung, Shenzhen (CN); Frank Effenberger, Freehold, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/473,196

(22) Filed: May 16, 2012

(65) Prior Publication Data

US 2012/0257887 A1   Oct. 11, 2012

Related U.S. Application Data

(63) Continuation of application No. 12/798,546, filed on Apr. 6, 2010, which is a continuation of application No. PCT/CN2008/073506, filed on Dec. 15, 2008.

(30) Foreign Application Priority Data

Jan. 14, 2008 (CN) .......................... 2008 1 0056163

(51) Int. Cl.
*H03M 13/00* (2006.01)
(52) U.S. Cl.
USPC ......................................... 714/752; 714/775
(58) Field of Classification Search
USPC ................................................ 714/752, 775
See application file for complete search history.

(56) References Cited

U.S. PATENT DOCUMENTS

| | | | |
|---|---|---|---|
| 6,496,543 B1 | 12/2002 | Zehavi | |
| 6,650,638 B1 * | 11/2003 | Walker et al. | 370/389 |
| 7,676,733 B2 * | 3/2010 | Ganga et al. | 714/775 |
| 8,136,013 B2 * | 3/2012 | Valliappan et al. | 714/762 |
| 2004/0015768 A1 | 1/2004 | Bordes et al. | |
| 2005/0028066 A1 | 2/2005 | Raahemi | |
| 2005/0249124 A1 | 11/2005 | Elie-Dit-Cosaque et al. | |
| 2006/0098686 A1 | 5/2006 | Takakuwa et al. | |
| 2006/0143548 A1 | 6/2006 | DelRegno et al. | |
| 2007/0157060 A1 | 7/2007 | Ganga et al. | |
| 2008/0040643 A1 | 2/2008 | Effenberger | |

FOREIGN PATENT DOCUMENTS

| | | |
|---|---|---|
| CN | 1445968 A | 10/2003 |
| CN | 1474607 A | 2/2004 |
| JP | 2005175599 A | 6/2005 |
| JP | 2006121269 A | 5/2006 |
| JP | 2008294511 A | 12/2008 |
| WO | WO 2009/006818 A1 | 1/2009 |

OTHER PUBLICATIONS

Partial Translation of Rejection Decision dated Apr. 19, 2012 in connection with Chinese Patent Application No. 200810056163.6.

(Continued)

*Primary Examiner* — Philip Guyton (57) ABSTRACT

A method and device for indicating an uncorrectable data block. The method includes: if a forward error correction decoding fails, setting synchronization character of at least one of the corresponding data blocks to a first character; and performing line decoding on the data block with the set first character, and outputting decoded data. With the invention, indicating the uncorrectable data block Simple and effective to a line decoding module can be implemented in case of a failure of FEC decoding.

1 Claim, 8 Drawing Sheets

(56) References Cited

OTHER PUBLICATIONS

Frank Effenberger, et al., "FEC Synchronization and Framing", Jan. 15, 2007, 26 pages.

Notice of Reasons for Rejection dated Aug. 16, 2011 in connection with Japanese Patent Application No. 2009-006071.

A. Belogolovy, et al., "Forward Error Correction for 10GBASE-KR PHY", Nov. 2005, 13 pages.

"Part 3: Carrier Sense Multiple Access with Collision Detection (CSMA/CD) Access Method and Physical Layer Specifications, Amendment 4: Ethernet Operation over Electrical Backplanes", 2007 IEEE, 8 pages.

Translation of Office Action dated Apr. 25, 2011 in connection with Chinese Patent Application No. 200810056163.6.

Translation of Office Action dated Nov. 9, 2011 in connection with Chinese Patent Application No. 200810056163.6.

IEEE Draft P802.3ap/Draft 3.2, "Part 3: Carrier Sense Multiple Access with Collision Detection (CSMA/CD) Access Method and Physical Layer Specifications, Amendment: Ethernet Operation over Electrical Backplanes", Dec. 4, 2006, 4 pages.

IEEE Std 802.3, "Part 3: Carrier sense multiple access with collision detection (CSMA/CD) access method and physical layer specifications", Dec. 9, 2005, 4 pages.

Invitation pursuant to Article 94(3) and Rule 71(1) EPC dated Oct. 25, 2011 in connection with European Patent Application No. 08 871 524.8.

Written Opinion of the International Searching Authority dated Mar. 26, 2009 in connection with International Patent Application No. PCT/CN2008/073506.

Adam Healey, LSI Corporation, "Foward Error Correction for 16GFC", Apr. 1, 2009, 7 pages.

Frank Effenberger, et al., "Consideration on reporting FEC uncorrectable signal", Jan. 14, 2008, 7 pages.

"FC-FS-3: Incorporating Forward Error Correction (FEC)", Jul. 14, 2009, 131 pages.

Frank Effenberger, et al., "FEC Synchronization and Framing", Jan. 15, 2007, 5 pages.

"Downstream Synchronization", Jan. 15, 2007, 21 pages.

Frank Effenberger, et al., "Considerations on FEC and Line code", May 28, 2007, 10 pages.

Frank Effenberger, et al., "A better sync header pattern for the FEC parity blocks", Nov. 12, 2007, 7 pages.

Jeff Mandin, "FEC Framing and Synchronization", Jan. 2007, 19 pages.

IEEE Draft P802.3av/D1.1, "92. Extensions of the Reconciliation Sublayer (RS) and Physical Coding Sublayer (PCS)/Physical Media Attachment (PMA) for 10GBASE-PR and 10/1GBASE-PRX for multipoint links and forward error correction", Feb. 8, 2008, p. 300-327.

IEEE Draft P802.3av/D1.1, "92. Extensions of the Reconciliation Sublayer (RS) and Physical Coding Sublayer (PCS)/Physical Media Attachment (PMA) for 10GBASE-PR and 10/1GBASE-PRX for multipoint links and forward error correction", Feb. 8, 2008, p. 300-337.

Communication dated May 26, 2011 in connection with European Patent Application No. 08 871 524.8.

International Search Report dated Mar. 26, 2009 in connection with PCT Application No. PCT/CN2008/073506.

Office Action dated Feb. 21, 2013 in connection with U.S. Appl. No. 12/798,546.

Notice of Reasons for Rejection dated Jul. 23, 2013 in connection Japanese Patent Application No. 2012-113203.

\* cited by examiner

SH[1]: the second bit of The second bit of multiple synchronization headers involving the
synchronization header         first and last Blocks is set as "0"

Figure 11

SH: synchronization  Multiple synchronization headers involving the
header                first and last Blocks is set as "10"

Figure 12

SH: synchronization header    An arbitrary SH is set as "00" or "11"

Figure 13

SH: synchronization header  Arbitrary multiple SHs are set   Arbitrary multiple SHs are set as
                               as "00" or "11"                     "00" or "11"

METHOD AND DEVICE FOR INDICATING AN UNCORRECTABLE DATA BLOCK

CROSS-REFERENCE TO RELATED APPLICATIONS

This application is a continuation of U.S. patent application Ser. No. 12/798,546, filed on Apr. 6, 2010, which is a continuation of International Application No. PCT/CN2008/073506, filed on Dec. 15, 2008. The International Application claims priority to Chinese Patent Application No. 200810056163.6, filed on Jan. 14, 2008, all of which are hereby incorporated by reference in their entireties.

TECHNICAL FIELD

The present invention relates to optical network communications, in particular to a method and device for indicating an uncorrectable data block.

BACKGROUND

The Passive Optical Network (PON) is a point-to-multipoint optical fiber access technology, and has advantages such as easy maintenance, broad bandwidth and low cost. The PON is an ideal physical platform for accessing multiple services such as voice, data and video. The PON includes an Optical Line Terminal (OLT), an Optical Network Unit (ONU) and an Optical Distribution Network (ODN). Because ODN includes a passive optical splitter/coupler, PON does not require elements having amplification and relay functions.

Figure 1:
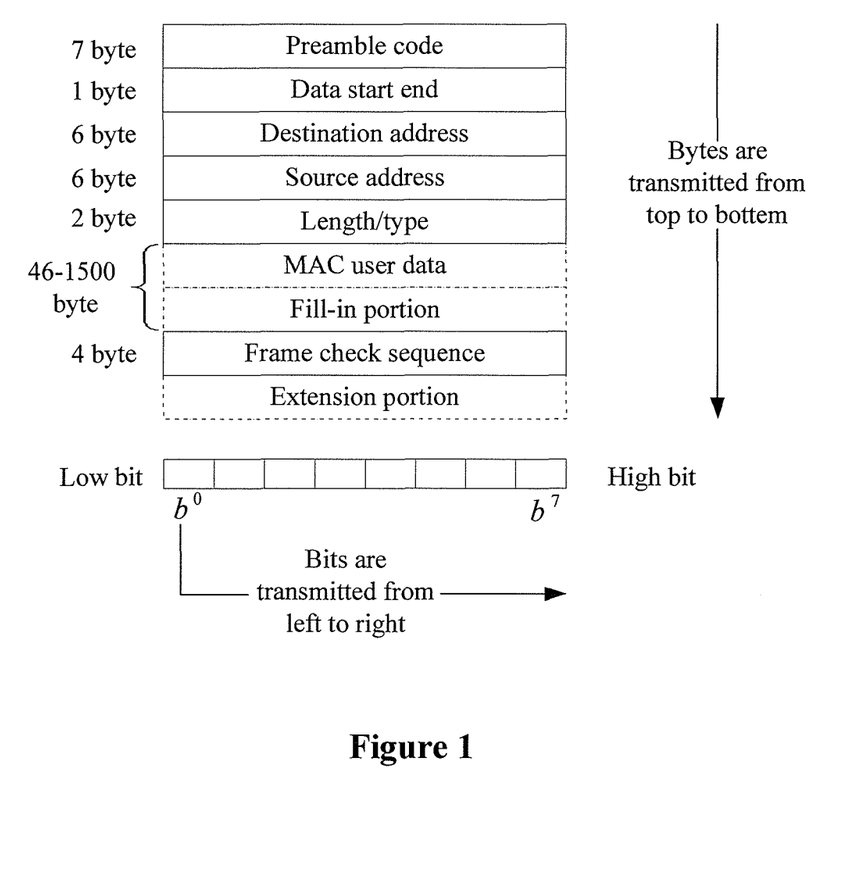
FIG. 1 is a structural diagram of an 802.3 Ethernet data frame corresponding to EPON in an Ethernet protocol.

The Ethernet Passive Optical Network (EPON) is a PON technique, which utilizes Ethernet protocols with mature and economical techniques, and has advantages such as easy maintenance, low cost, broadband transmission and better performance-price ratio. In the Ethernet protocol, a structure of an 802.3 Ethernet data frame corresponding to the EPON is illustrated in FIG. 1. There is a 4-byte Cyclic Redundancy Check (CRC) at the end, i.e. before the Extension portion, of each 802.3 Ethernet data frame. A receiver can detect certain errors according to the CRC result.

For improving the anti-jamming capability BER performance of the system and increasing the power budget of the system, at present the 10G EPON system being constituted by the Institute of Electrical and Electronics Engineers (IEEE) 802.3av employed forward error control (FEC) coding technique. The basic operation of the FEC technique is to add parity check bits to the end of a transmitting Ethernet data portion according to a predefined rule between the parity check portion and the data portion. The receiver, on receiving the Ethernet frame from the transmitter, verifies the association between the Ethernet data portion and the parity check portion of an FEC codeword according to the predefined rule. If finding the association is incorrect, i.e. the FEC decoding fails, the receiver determines that error occurs during the transmission of the Ethernet frame and indicates the uncorrectable data block.

Besides the above FEC coding technique, another coding technique, line coding is employed at the physical layer of the EPON system. The basic operation of the line coding is that the original input data is converted into data in a format that is receivable by the receiver. Meanwhile, the line coding must ensure that there is sufficient transition that can be provided to a clock recovery circuit. The encoder also provides a method for aligning data with word, and the line coded sequence can maintain good direct current balance. At present, in the 10G EPON system being constituted by the IEEE 802.3av workgroup, line coding mechanisms with higher coding rate such as 64b/66b and 64b/65b are employed. These two line coding mechanisms utilize a scrambler, where the synchronization character and control character of the two line coding mechanisms bypass the scrambler, i.e. the synchronization character does not change. According to the 64B/66B coding mechanism, a two-bit synchronization character (synchronization header) is added on the basis of 64-bit information. The two-bit synchronization character has only two values, "01" and "10". The synchronization character "01" indicates that all of the 64-bit information is data information, the synchronization character "10" indicates that the 64-bit information includes data information and control information. The synchronization character "00" or "11" indicates that error occurs during the transmission. The usage of the synchronization character ensures that there is at least one transition at intervals of 66 bits, so as to facilitate block synchronization. The 64-bit information is scrambled with an auto-synchronization scrambling mechanism, which can ensure that there is sufficient transition for the transmitted data to an utmost extent for facilitating clock recovery. Being different from the 64B/66B coding mechanism, the 64B/65B coding utilizes a 1-bit data/control character. The data/control character "0" indicates that all the 64 bits are data information. The data/control character "1" indicates the 64-bit information includes data information and control information.

For the detection of known error at the Medium Access Control (MAC) layer via CRC verification, a control character /E/ with a length of one byte, is used in the standard of the IEEE 802.3 10G system. The control character /E/ indicates an error.

Figure 2:
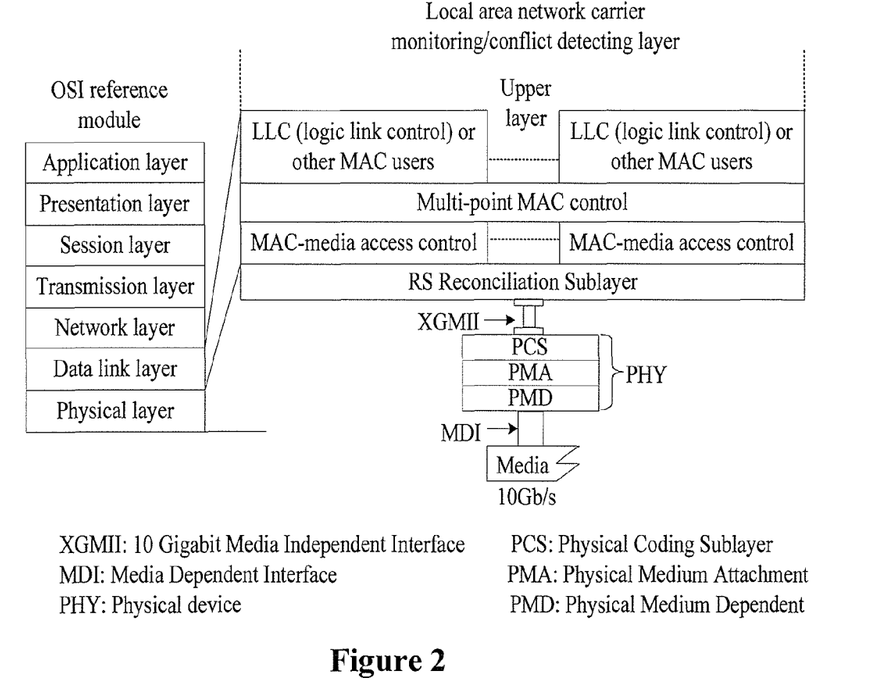
FIG. 2 illustrates a relation between an open systems interconnection reference model and an IEEE 802.3 10G bit local area network model.

A schematic diagram of a corresponding relation between an open systems interconnection reference model and an IEEE 802.3 10G bit local area network model is illustrated in FIG. 2. At present, the 10G EPON system constituted by the IEEE 802.3av workgroup utilizes this model, the transmission rate at the physical layer of which reaches 10 Gbps.

As illustrated in FIG. 2, if the data received from the GIGABIT MEDIA INDEPENDENT INTERFACE (XGMII) by the Reconciliation Sublayer (RS) includes a control character /E/, it indicates that error occurs to the received data where the /E/ locates. To ensure that the RS can detect the error by the CRC checking of the 802.3 Ethernet data frame after the data arrives at the MAC layer, the RS needs to preprocess the received data. One of processing methods is to replace part of the data so that the error can be checked by CRC.

Figure 3:
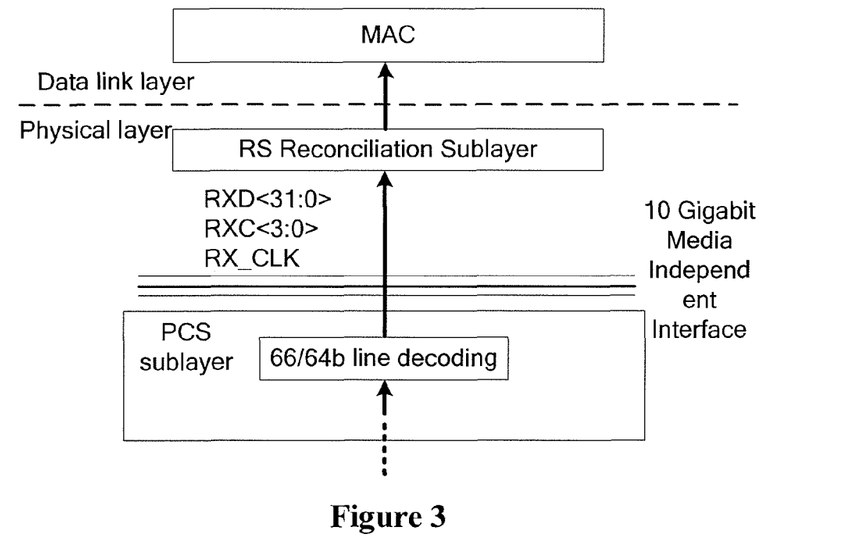
FIG. 3 illustrates the location of the 66/64b line decoding module at the receiving end in the IEEE 802.3 10G standard.

The control character /E/ may be inserted at the transmitting end, or be replaced at the receiving end. In case of 64/66b line coding technique, the control character /E/ is received and processed generally in the 66/64b line decoding module of the receiving end. As illustrated in FIG. 3, in the existing IEEE 802.3 10G Ethernet standard, the 66/64b line decoding module is located at the Physical Coding Sublayer (PCS).

At the physical layer of the existing IEEE 802.3 10G Ethernet standard, the 802.3 Ethernet data frame is identified by indicator /S/ and /T/. /S/ indicates a start of data frame, and /T/ indicates a termination of data frame. The 66/64b line decoding module determines that error occurs to a received data block, if the 66/64b line decoding module at the PCS layer of the receiver, after receiving a control character /S/ indicating a start of data frame, receives the data block containing a synchronization header "10", including any control character except a control character /T/ indicating a termination of data frame, or if the 66/64b line decoding module at the PCS layer of the receiver receives an invalid data block having a synchronization header "00" or "11". In this case, the 66/64b line decoding module replaces all eight bytes in the data block with control characters /E/. The above /S/, /T/ and /E/ have a length of one byte respectively.

The receiver of the 10G EPON system constituted by the IEEE802.3av workgroup has employed the 66/64b line decoding module, the XGMII and RS as well as the FEC coding technique at its PCS layer. However, there is no solution of how to indicate the uncorrectable data block to the line decoding module in the EPON system after the failure of FEC decoding.

SUMMARY

An embodiment of the present invention is to provide a method and device for indicating an uncorrectable data block, thereby solving the problem of how to indicate the uncorrectable data block to a line decoding module after a failure of FEC decoding.

An object of an embodiment of the present invention is attained by the following technical solution.

A method for indicating an uncorrectable data block, including:

if a forward error correction decoding fails, setting synchronization character of at least one data block of data of decoding failure to a first character; and performing line decoding on the data block containing the first character, and outputting decoded data.

A device for indicating an uncorrectable data block includes:

a first character setting module, adapted to perform forward error correction decoding, and if a failure of the forward error correction decoding is detected, set synchronization character of at least one data block of data of decoding failure to a first character;

a line decoding module, adapted to perform line decoding on the data block containing the first character, and outputting decoded data.

It can be seen from the technical solution of embodiments of the present invention, by setting synchronization characters of part or all of data blocks (Blocks) of error data by detecting a failed FEC decoding (data portion of an FEC codeword) to a first character, error occurrence to the data blocks can be determined by the line decoding module according to the line decoding rule and the first character.

DETAILED DESCRIPTION

In an embodiment of the present invention, the error data is obtained after an FEC decoding failure of an FEC codeword. The error data is the data portion of the FEC codeword prior to the FEC decoding that includes multiple blocks, each of which including a synchronization header and data information. Then, the synchronization characters of part or all of blocks of the error data are set to first characters.

If a 64/66b line coding is applied to the blocks, the first character is "11", "00" or "10". In practical application, synchronization characters of any one or more blocks of data portion of the FEC codeword may be set to at least one of the values of "11", "00" and "10". For example, synchronization characters of any one or more blocks of the data portion of the FEC codeword can be directly set to at least one of "11" and "00". In another example, synchronization characters of the first and last blocks or multiple blocks including the first and last blocks of the data portion of the FEC codeword can be set to "10". In a further example, synchronization characters of any one or more blocks of the data portion of the FEC codeword are directly set to "10", and the synchronization characters of at least one of the rest blocks are directly set to at least one of "11" and "00".

If a 64/65b line coding is applied to the blocks, the first character is set to "1". In practical application, synchronization characters of the first and last blocks or multiple blocks including the first and last blocks of the data portion of the FEC codeword may be set to "1".

Then, each block is input to the descrambler, the data information of the block changes, but synchronization header bits of the block bypass the descrambler such that the synchronization header bits do not change. Each descrambled block including the synchronization header and descrambled data information is then sent to a line decoder. The line decoder detects errors within part or all of blocks according to the synchronization characters of part or all of the blocks having a value of "11" or "00" or according to the synchronization characters of apart or all of the blocks having a value of "10" or "1" but control characters included in the part or all of the blocks do not conform with a line decoding rule. The line decoder replaces the descrambled data of the part or all of the blocks, and outputs the decoded data.

Embodiments of the present invention are described in detail with reference to the attached drawings.

Figure 4:
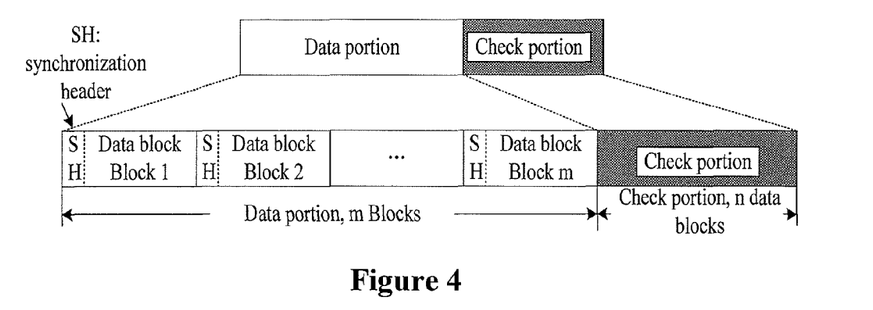
FIG. 4 is a structural diagram of an FEC codeword in the 10G EPON system according to a first embodiment of the present invention.

A first embodiment of the present invention: This embodiment provides a method for setting the synchronization header of a data block of error data once FEC decoding fails, if a 64/66b line code is employed at the physical layer of the 10G EPON system and only the second bit of the synchronization header involves in the FEC coding, In this embodiment, a structure of an FEC codeword with the FEC coding and the 64/66b line coding is illustrated in FIG. 4, in which the former m Blocks (data units) are 802.3 Ethernet data, and the latter blocks are parity check blocks. If RS (255, 223) coding is adopted, m=27 and n=4.

During the data receiving process, i.e. after a control character /S/ indicating a start of data frame is identified and if the FEC decoding fails, synchronization headers of part or all of blocks of the data portion of the FEC codeword as illustrated in FIG. 4 are set to a control synchronization character "10" or an invalid synchronization header "00" or "11", in order to indicate the uncorrectable data block.

Figure 5:
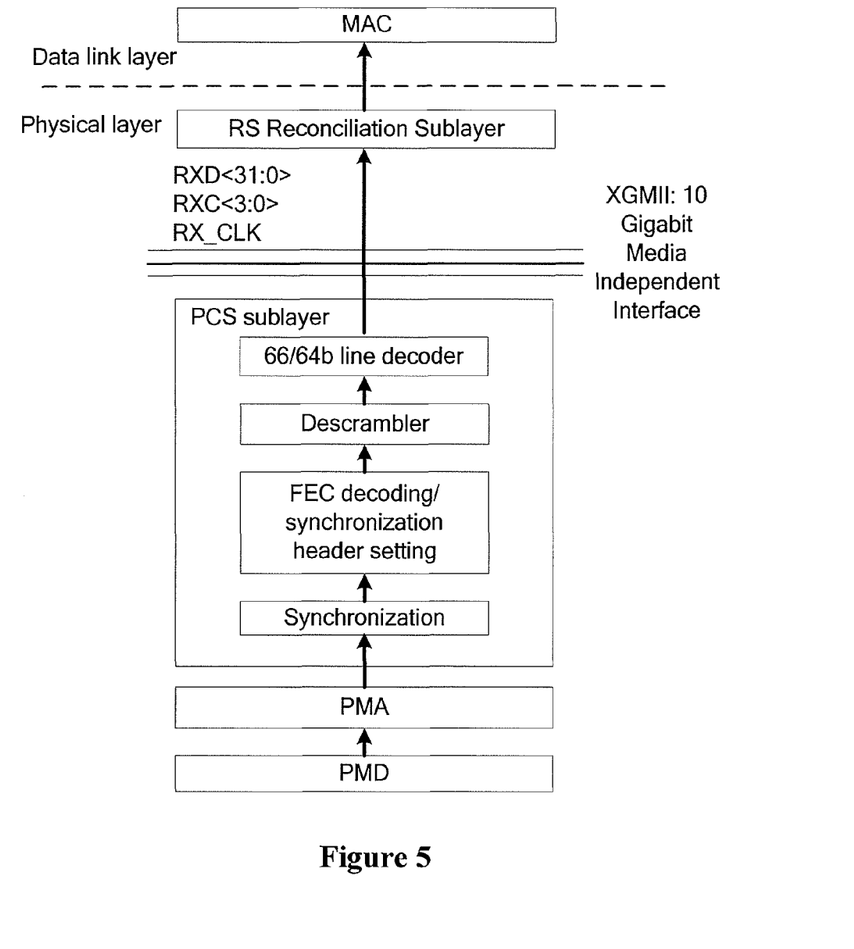
FIG. 5 is a structural diagram of the receiver in the 10G EPON system according to the first embodiment of the present invention.
Figure 6:
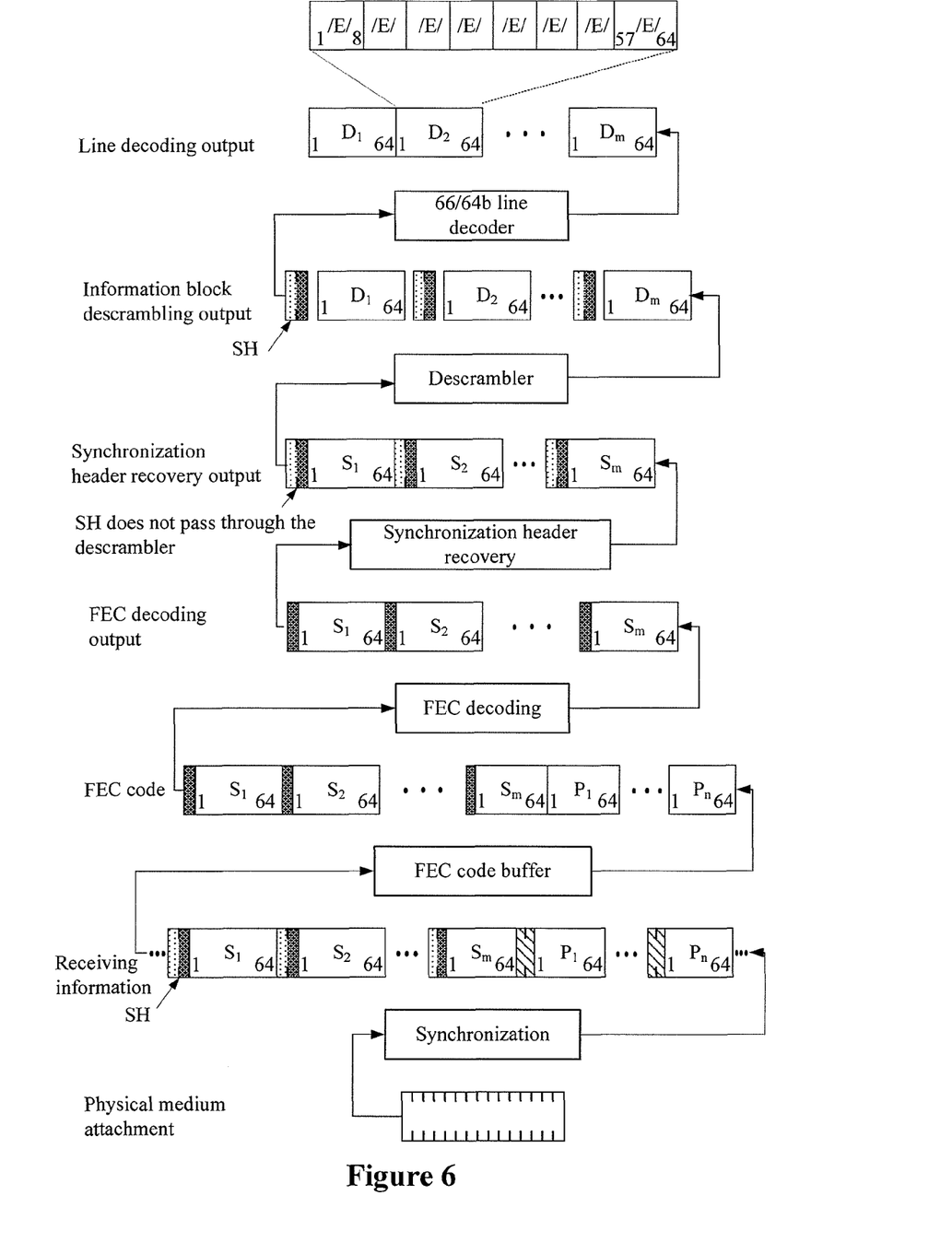
FIG. 6 is a flowchart of indicating an uncorrectable data block at the receiver of the 10G EPON after detecting failure of FEC decoding according to the first embodiment of the present invention.

A structural diagram of a receiving end in the 10G EPON system according to this embodiment is illustrated in FIG. 5. A flowchart of indicating an uncorrectable data block at the receiver in case of an FEC decoding failure is illustrated in FIG. 6. In the process, after the synchronization of the received blocks, the blocks are first sent to the buffer of the FEC decoding module. Because the first synchronization header bit of the data portion blocks and all synchronization header bits of the parity check portion blocks do not involve in FEC coding, the FEC decoding module removes the synchronization header bits of the blocks which do not involve in the FEC coding so as to form another FEC codeword in another format corresponding to the encoding, and input the FEC codeword in the another format to the FEC decoding module for performing FEC decoding.

The FEC decoding module performs decoding on the FEC codeword in the format corresponding to the encoding. The synchronization headers of part of the blocks in the FEC codeword are set to "10", "00" or "11" after an FEC decoding failure.

Methods for setting the synchronization header according to this embodiment are described as follows:

If the synchronization header can be set to "00" or "11", two methods are provided: the first method is to set the first synchronization header bit to be the same as the second synchronization header bit in the synchronization header recovery process; the second method is to set the synchronization header bits to "00" or "11" directly in the synchronization header recovery process.

If the synchronization header is set to "00" or "11", two methods are provided: the first method is to set the second bit of the synchronization header, output from the FEC decoding module, to "0" or "1" corresponding to either of "00" and "11" as designated, then the first synchronization header bit is set to be the same as the second synchronization header bit in the synchronization header recovery process; the second method is to set the synchronization header bits to "00" or "11" directly as designated in the synchronization header recovery process.

Figure 7:
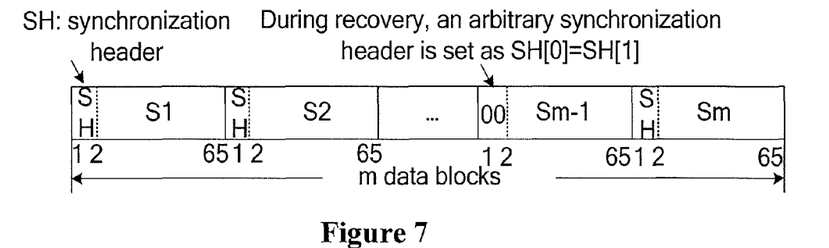
FIG. 7 is a data structure diagram of an FEC codeword after the synchronization header of any block of the data portion of the FEC codeword is set to "00" or "11" according to the first embodiment of the present invention.

During the above operations on the synchronization header, only the synchronization header of any block of the data portion of the FEC codeword may be set, the resulted first bit is set to the same as the second bit, i.e. SH[0]=SH[1]. SH[0] represents the first bit of the synchronization header, and SH[1] represents the second bit of the synchronization header. With the above operations, the synchronization header after recovery is "00" or "11". A structural diagram of the FEC codeword after the synchronization header of any block of the data portion of the FEC codeword is set is illustrated in FIG. 7.

Figure 8:
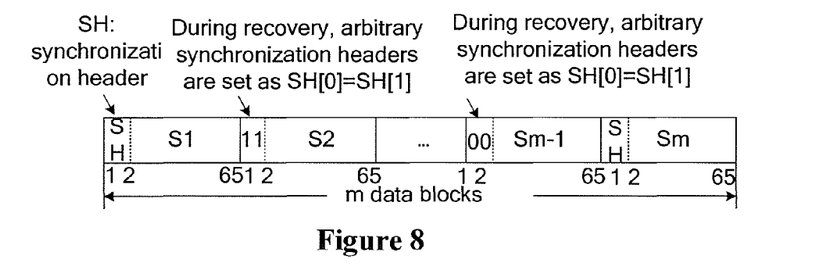
FIG. 8 is a data structure diagram of an FEC codeword after synchronization headers of any blocks of the data portion of the FEC codeword are set to "00" or "11" according to the first embodiment of the present invention.

Alternatively, during the above operations on the synchronization header, only synchronization headers of any blocks of data portion of the FEC codeword may be set, the resulted first bit is set to the same as the second bit, i.e. SH[0]=SH[1]. A structural diagram of the FEC codeword after synchronization headers of any Blocks of data portion of the FEC codeword are set is illustrated in FIG. 8.

If the synchronization header is set to "10", two methods are provided: the first method is to set the second bit or the first bit of a synchronization header to "0" or "1" respectively after the FEC decoding, if that bit of the synchronization header involves in the FEC coding, then a synchronization header default inversion recovery mechanism is adopted to recover a synchronization header "10" in a synchronization header recovery; the second method is to set the synchronization header bits to "10" directly in the synchronization header recovery process after the FEC decoding.

Figure 9:
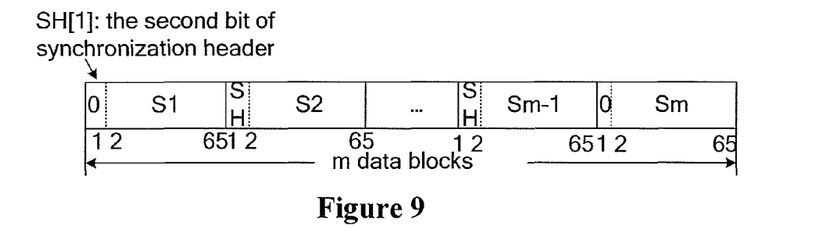
FIG. 9 is a data structure diagram of an FEC synchronization headers of the first and last blocks of the data portion of the FEC codeword are set to "10" according to the first embodiment of the present invention.
Figure 10:
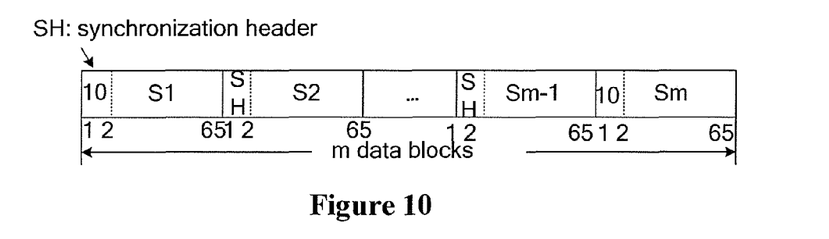
FIG. 10 is another data structure diagram of an FEC synchronization headers of the first and last blocks of the data portion of the FEC codeword are set to "10" according to the first embodiment of the present invention.

During the above operations on the synchronization header, only synchronization headers of the first and the last blocks of the data portion of the FEC codeword may be set. A structural diagram of data portion of the FEC codeword after the setting is illustrated in FIG. 9 if the first method is adopted. A structural diagram of data portion of the FEC codeword after the setting is illustrated in FIG. 10 if the second method is adopted.

Figure 11:
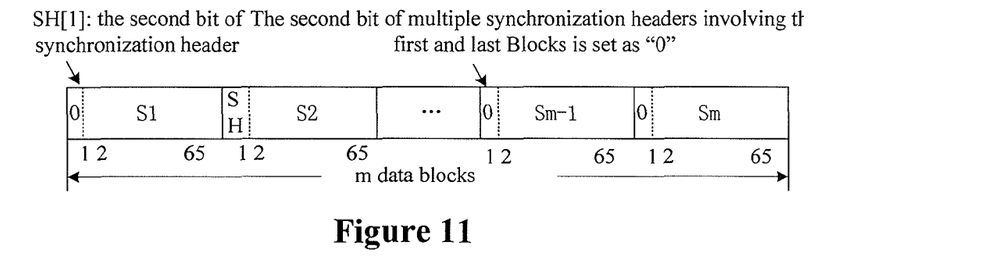
FIG. 11 is a data structure diagram of an FEC codeword after synchronization headers of multiple blocks including the first and last blocks of the data portion of the FEC codeword are set to "10" according to the first embodiment of the present invention.
Figure 12:
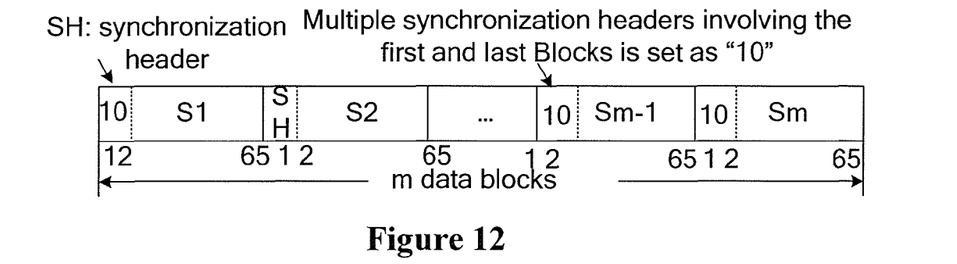
FIG. 12 is another data structure diagram of an FEC codeword after synchronization headers of multiple blocks including the first and last blocks of the data portion of the FEC codeword are set to "10" according to the first embodiment of the present invention.

Alternatively, during the above operations on the synchronization header, the synchronization headers of multiple blocks including the first and the last blocks of data portion of the FEC codeword may be set. A structural diagram of data portion of the FEC codeword is illustrated in FIG. 11 if the first method is adopted. A structural diagram of data portion of the FEC codeword is illustrated in FIG. 12 if the second method is adopted.

A second embodiment: This embodiment provides, if a 64/66b line coding is employed at the physical layer of the 10G EPON system and two bits of the synchronization header involve in an FEC coding, a method for setting the synchronization header of a data block once there is an FEC decoding failure.

Because two bits of the synchronization header involve in the FEC coding, the synchronization header recovery process is not required and the setting of synchronization header can be performed in the FEC decoding module. If the FEC decoding fails, in order to indicate that error occurs, synchronization headers of part of blocks of the FEC codeword as illustrated in FIG. 4 are set to a control block synchronization header "10" or an invalid synchronization header "00" or "11", for indicating the uncorrectable data block.

Methods for setting a synchronization header according to this embodiment are described as follows.

Figure 13:
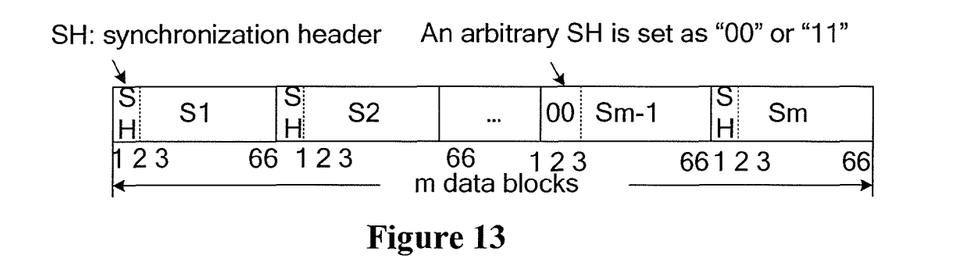
FIG. 13 is a data structure diagram of the synchronization header of any block of the data portion of the FEC codeword is set to "00" or "11" according to a second embodiment of the present invention.
Figure 14:
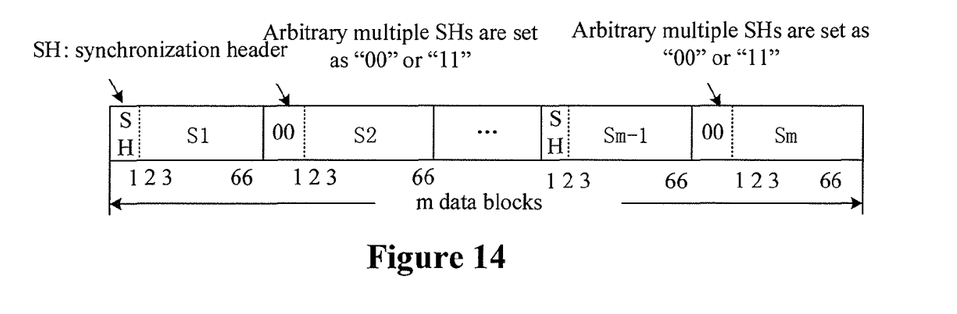
FIG. 14 is a data structure diagram of an FEC codeword after synchronization headers of any blocks of the data portion of the FEC codeword are set to "00" or "11" according to the second embodiment of the present invention.

If the synchronization header is to be set to "00" or "11", the FEC decoding module may set the synchronization header of any data portion block of the FEC codeword to "00" or "11", i.e. SH=00 or SH=11. A data structure of the FEC decoding output after the setting is illustrated in FIG. 13. Alternatively, the FEC decoding module may set the synchronization headers of any data portion blocks to "00" or "11", i.e. SH=00 or SH=11. A data structure of the FEC decoding output after the setting is illustrated in FIG. 14.

Figure 15:
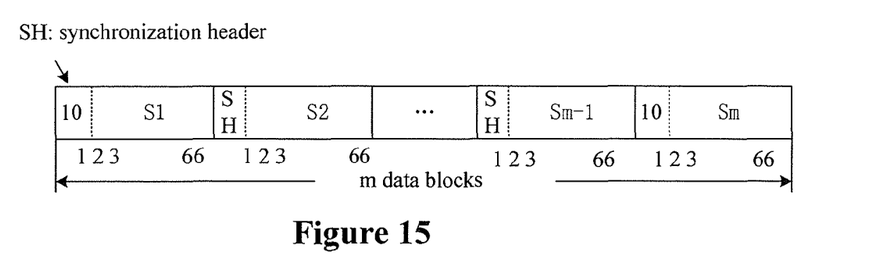
FIG. 15 is a data structure diagram of an FEC codeword after synchronization headers of the first and last blocks of the data portion of the FEC codeword are set to "10" according to the second embodiment of the present invention.
Figure 16:
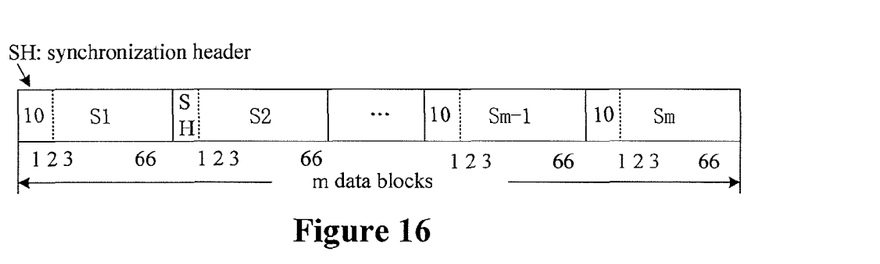
FIG. 16 is another data structure diagram of an FEC codeword after synchronization headers of multiple blocks including the first and last blocks of data portion of the FEC codeword are set to "10" according to the second embodiment of the present invention.

If the synchronization header is to be set to "10". The FEC decoding module may set the synchronization headers of the first and the last data portion blocks of the FEC codeword to "10", i.e. SH=10, so that it could set /E/ correctly even if the blocks include the termination control character /T/ or the start control character /S/. A data structure of the FEC decoding output after the setting is illustrated in FIG. 15. Alternatively, the FEC decoding module may set synchronization headers of multiple blocks including the first and last data portion blocks of the FEC codeword to "10", i.e. SH=10. A data structure of the FEC decoding output after the setting is illustrated in FIG. 16.

A third embodiment: This embodiment provides a method for setting a synchronization header once an FEC decoding fails if a 64/65b line coding is employed at the physical layer and two bits of the synchronization header involve in the FEC coding, In the case of 64/65b line coding, the synchronization header is in the form of only "0" or "1", where "0" indicates that 64 bits are all data information, and "1" indicates that 64 bits includes data information and control information. Therefore, only "1" may be used to set synchronization header to indicate the uncorrectable data block once the FEC decoding fails.

In order to avoid the fact that the 65/64b line decoding module can not properly replace the data block of the error data, due to FEC decoding failure, with /E/, which is in the location of the termination control character /T/ or the start control character /S/, a method for setting the synchronization header according to this embodiment is described as follows.

Figure 17:
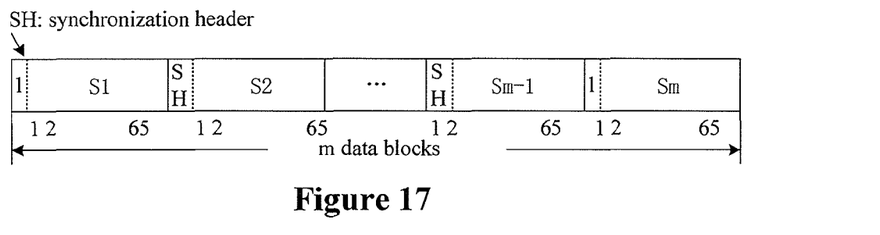
FIG. 17 is a data structure diagram of an FEC codeword after synchronization headers of the first and last blocks of the data portion of the FEC codeword are set to "1" according to a third embodiment of the present invention.
Figure 18:
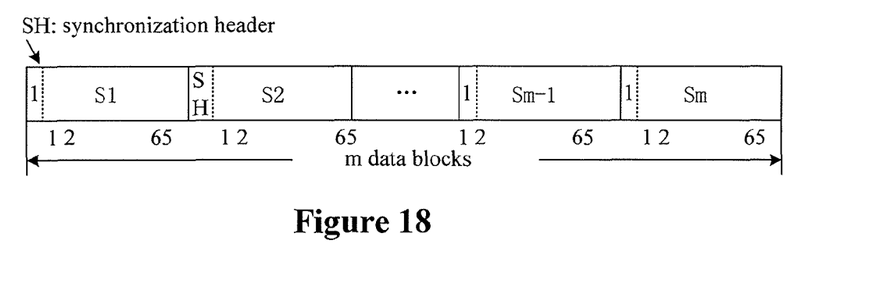
FIG. 18 is another data structure diagram of an FEC codeword after synchronization headers of multiple blocks including the first and last blocks of the data portion of the FEC codeword are set to "1" according to the third embodiment of the present invention.

The FEC decoding module sets the synchronization headers of the first and last data portion blocks of the FEC codeword to "1", i.e. SH=1. A data structure of the FEC decoding module output after the setting is illustrated in FIG. 17. The FEC decoding module sets synchronization headers of any blocks including the first and last data portion blocks of the FEC codeword to "1", i.e. SH=1. A data structure of the FEC decoding output after the setting is illustrated in FIG. 18.

Preferably, taking the blocks as input, the data portion of the FEC codeword after the above operations to the synchronization headers is sent to a descrambler, the data information bits of the blocks are changed but the synchronization headers of the blocks bypass the descrambler. The data portion of the original FEC codeword after the descrambled is sent to a line decoding module. If the 64/66b line coding is adopted, the line decoder detects errors within part or all of the blocks in accordance with the synchronization characters having a value of "11" or "00"; or in accordance with the synchronization characters of part or all of the blocks having a value of "10" but the blocks do not conform with the 64/66b line decoding rule.

If the 64/65b line coding is adopted, the line decoder detects errors within part or all of the blocks in accordance with the synchronization characters of the part or all of the blocks of the FEC codeword having a value of "1" but the part or all of blocks do not conform with the 64/65b line decoding rule.

As a result, the line decoding module replaces part or all blocks with /E/ by replacing all eight bytes of each block with /E/, thereby indicating the uncorrectable data block by utilizing /E/, so that the MAC layer can detect the error via its own CRC verification.

Figure 19:
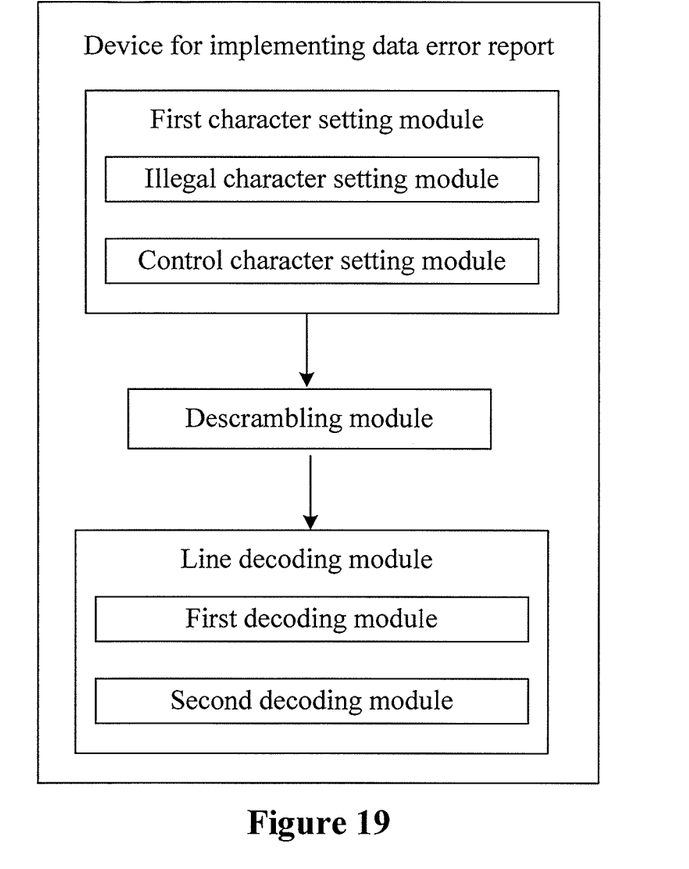
FIG. 19 is a structural diagram of a device for indicating an uncorrectable data block according to an embodiment of the present invention.

A structure of a device for indicating an uncorrectable data block according to an embodiment of the present invention is illustrated in FIG. 19. The device includes a first character setting module and a line decoding module, and may further include a descrambling module.

A first character setting module, adapted to perform forward error correction decoding, and if a failure of the forward error correction decoding is detected, set synchronization character of at least one data block of data of decoding failure to a first character. The first character is an illegal synchronization character specified in a line coding rule of decoding each block, or a synchronization character of a data block including control information. The first character setting module includes at least one of an illegal character setting module and a control character setting module.

The descrambling module is adapted to descramble data information of each block containing the first character before the line decoding module decodes the data block containing the first character.

The line decoding module is adapted to perform line decoding on the blocks containing the first character and output the decoded data. Also the line decoding module detects error within the data block containing the first character according to a predefined line coding rule and the first character, and replaces the descrambled data information in the data block. The line decoding module includes at least one of a first decoding module and a second decoding module.

The first character setting module may include an illegal character setting module, which is adapted to set the synchronization characters of part or all of blocks with error to the illegal synchronization character specified in the line coding rule. In the case of a 64/66b line coding, the illegal character is "11" or "00".

The first character setting module may further include a control character setting module, which is adapted to set synchronization characters of part or all of data blocks of the error data to a synchronization character of a data block including control information. In the case of a 64/66b line coding, the synchronization character is to be set to "10". In the case of a 64/65b line coding, the synchronization character is to be set to "1".

The first character setting module may include both of the illegal character setting module and the control character setting module.

The line decoding module may include the first decoding module, which is adapted to determine part or all of data blocks of the error data with illegal synchronization characters, replace the descrambled data information of the part or all of data blocks, then output the replaced data; or determine part or all of data blocks of the error data with legal synchronization characters and perform line decoding on the part or all of blocks, then output decoded blocks.

The line decoding module may include the second decoding module, which is adapted to determine part or all of data blocks of the error data with synchronization characters of the data blocks containing control information (i.e. "10" or "1"); if the part or all of data blocks do not conform with the line coding rule, replace the descrambled data information of the part or all of data blocks, and output the replaced data; if the part or all of data blocks conform with the line coding rule, perform line decoding on the part or all of the data blocks and output the decoded data, respectively.

In another embodiment, the first decoding module is adapted to replace the descrambled data of the part or all of data blocks, perform line decoding on the part or all of data blocks, and output the replaced data, after the first decoding module determines the part or all of data blocks of the error data with illegal synchronization characters;

the second decoding module is adapted to replace the descrambled data of the part or all of data blocks, perform line decoding on the part or all of data blocks, and output the decoded data, after the second decoding module determines the part or all of data blocks of the error data with synchronization characters of the data blocks containing control information.

The line decoding module may include both of the first decoding module and the second decoding module.

As described above, the embodiment of the present invention provides an easy and effective mechanism for indicating the uncorrectable data block to the line decoding module in the case of failure of FEC decoding. Therefore, the line decoding module can utilize the existing error report function of the control character /E/ of the Ethernet system to report error to the RS layer where the error data can be preprocessed, so that the MAC layer can detect the error via its own CRC verification.

The above description is merely for preferred detailed embodiments of the present invention, which the protective scope of the present invention is not limited to. Any modifications and settings that can be easily made by those skilled in the art within the disclosure of the present invention should fall within the scope of the present invention. Therefore, the protective scope of the present invention should be defined as the claims.

What is claimed is:

1. A method of indicating an uncorrectable data block in a Passive Optical Network (PON), the method comprising:
    performing forward error correction (FEC) decoding on an FEC codeword;
    if the forward error correction decoding fails, setting a synchronization character of at least one data block of data having a decoding failure to a first character;
    performing 64/66b line decoding on a data block that comprises the first character, wherein the first character comprises "10", "11" or "00";
    when synchronization characters of first and last blocks of data of the FEC codeword are "10" and a synchronization character of at least one other block of data of the FEC codeword is at least one of "11" or "00", replacing all data in data blocks of the FEC codeword to control character /E/; and
    outputting decoded data.

* * * * *